June 30, 1970
H. T. BELL
3,517,750
ROLL-OVER PLOW STRUCTURE
Filed March 8, 1967
2 Sheets-Sheet 1
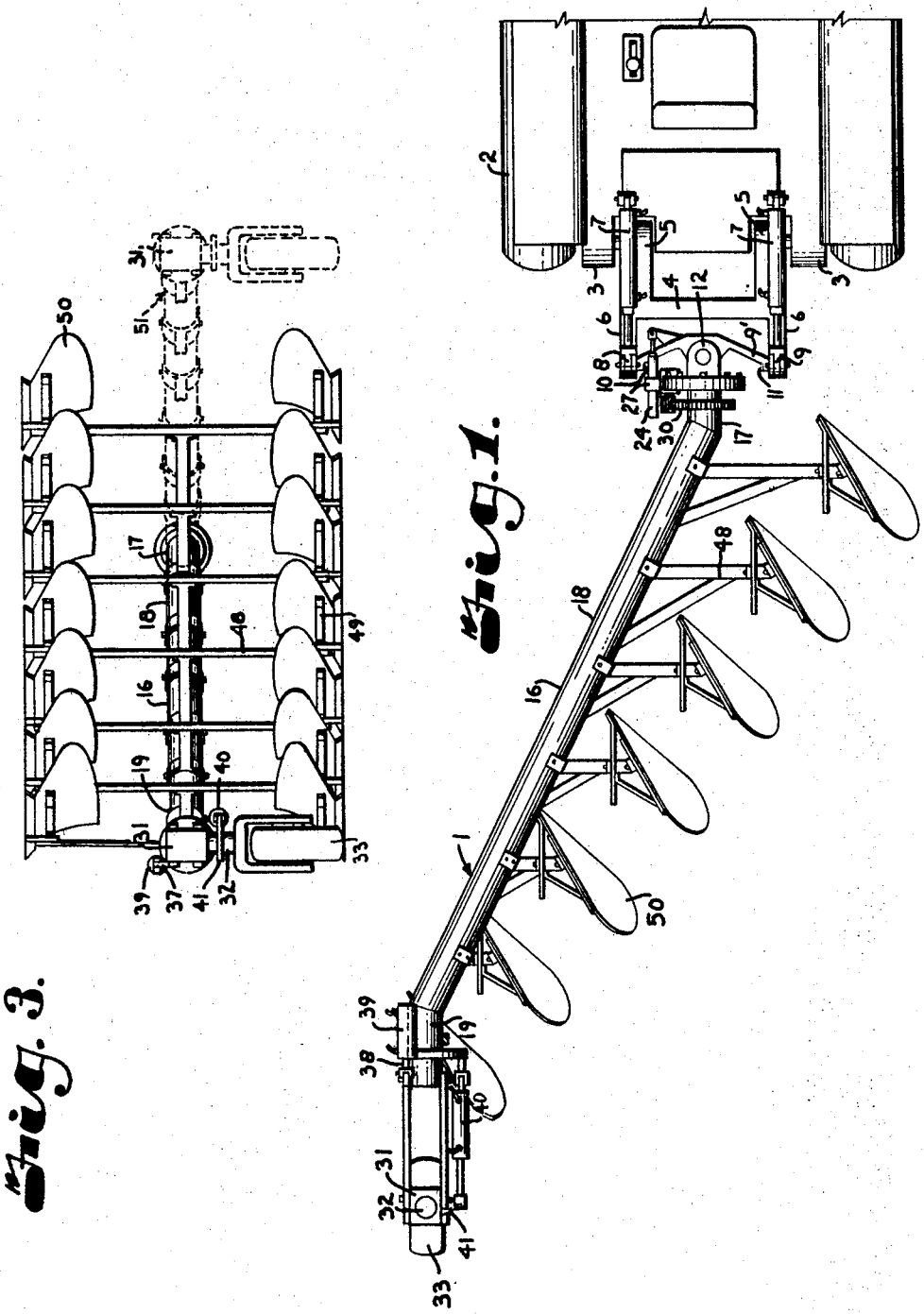
INVENTOR.
HENRY T. BELL
BY
Fishburn and Gold
ATTORNEYS June 30, 1970　　　　　　　H. T. BELL　　　　　　3,517,750
ROLL-OVER PLOW STRUCTURE
Filed March 8, 1967　　　　　　　　　　　　　2 Sheets-Sheet 2
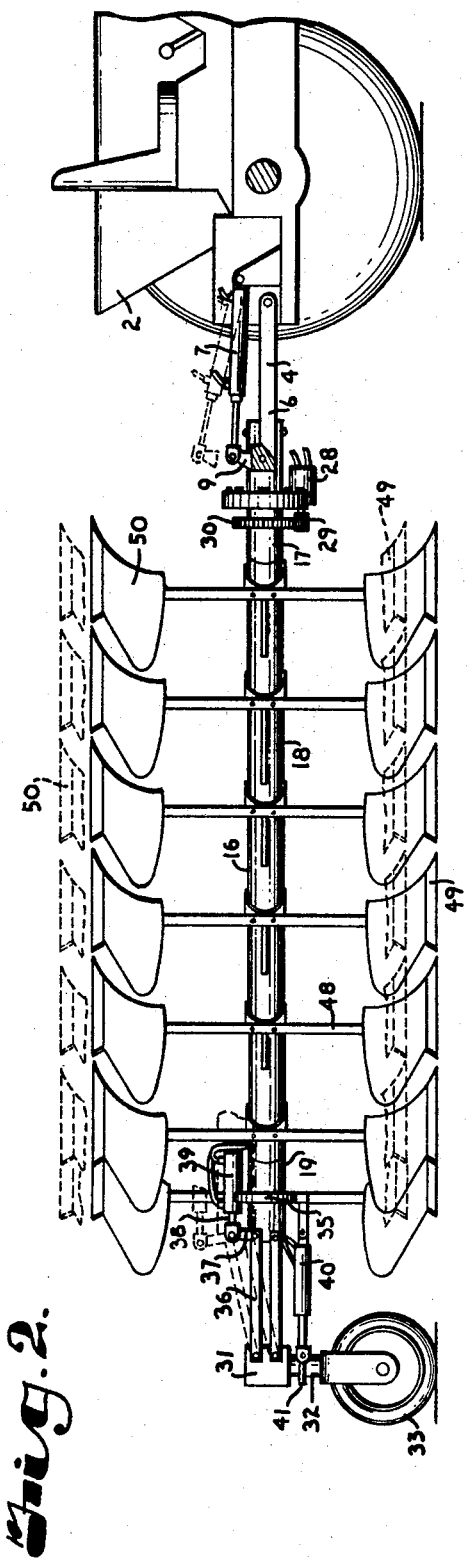
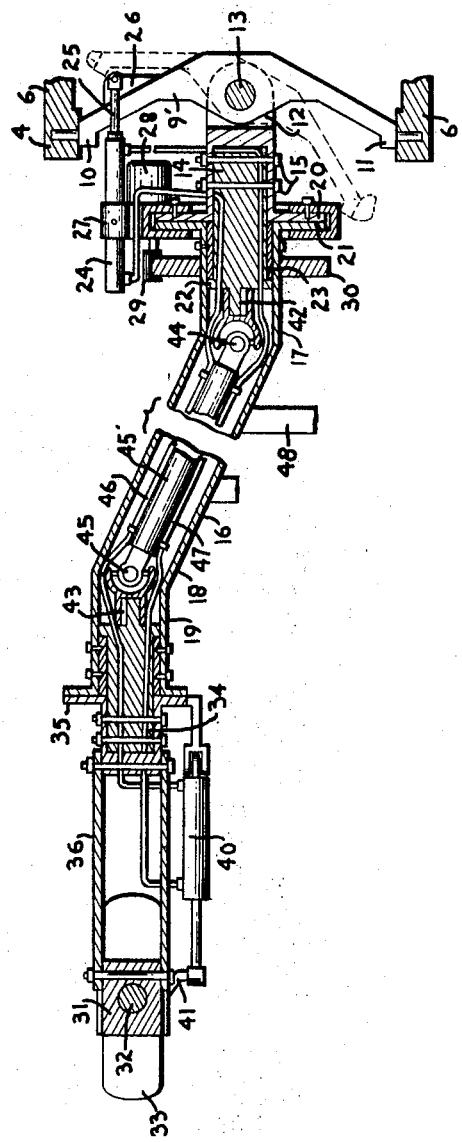
INVENTOR.
HENRY T. BELL
BY
Fishburn and Gold
ATTORNEYS

United States Patent Office 3,517,750
Patented June 30, 1970

3,517,750
ROLL-OVER PLOW STRUCTURE
Henry Thomas Bell, Rte. 2, Odessa, Mo. 64076
Filed Mar. 8, 1967, Ser. No. 621,485
Int. Cl. A01b 3/28
U.S. Cl. 172—226
5 Claims

ABSTRACT OF THE DISCLOSURE

A two-way plow structure which is ground supported at the rear during roll-over comprises a hollow rigid elongated support tube or beam angling rearwardly and laterally of the pulling tractor and has tool carriers rigidly secured to and spaced therealong with both right and left hand plow units. A rear wheeled carriage providing the rear support, is maintained in constant ground contacting relation during roll-over through torsional rigidity supplied by a torsional shaft extending through the support beam and connected by universal joints forwardly to draft structure and rearwardly to the wheeled carriage. An hydraulic cylinder located at the forward end of the plow structure is adapted to telescope in response to the plow structure pivoting laterally about the tractor and is connected through hoses to an hydraulic cylinder at the rear of the plow structure which guides the rear supporting wheel to produce desirable trailing characteristics.

---

Roll-over, two-way plows of the type wherein alternately operating right and left hand plow bottoms are mounted on a revolving carrier have been heretofore suggested, for example, to be used on irrigated fields where it is necessary or desirable to keep the land flat. Such plows are drawn back and forth in adjacent paths across a field instead of plowing around the field in the conventional manner. Such prior art roll-over plows, however, exhibited one or more serious disadvantages. For example, the necessity of completely bodily lifting the plow above the ground during roll-over, putting an undue strain on the tractor lift structure and severely limiting the weight and configuration of the plow structure. To avoid this, certain prior-art plows included a rear wheeled carriage adapted to support the plow during roll-over as well as during plowing, but such rear structure as well as tractor hitching structure used therewith has been very wide, massive and complex, rendering the equipment expensive, difficult to use and bulky in storage. Further, such rear support carriages merely trailed behind the plow and resulted in the requirement of a large area at the end of each plowing path for the tractor and plow to be turned around and properly aligned to begin the next plowing path.

This invention provides a two-way, roll-over plow structure of simple and slender construction which includes a rear carriage having a supporting wheel contacting the ground during plowing and during roll-over. The rear carriage supporting wheel is automatically steered in response to lateral pivoting of the plow structure about the tractor during turn-around to provide rapid and easy plowing path alignment in a small space. These, and other objects and advantages of this invention will become apparent from the following description taken in connection with the accompanying drawings wherein are set forth by way of illustration and example certain embodiments of this invention.

FIG. 1 is a plan view of a two-way plow structure embodying this invention.

FIG. 2 is a side elevation of the plow structure with broken lines indicating an elevated position preferably assumed during roll-over.

FIG. 3 is a rear view of the plow structure with broken lines indicating the relative position thereof assumed upon roll-over.

FIG. 4 is a fragmentary cross-sectional plan view through the plow structure, on a larger scale, showing the interior construction and arrangement of parts.

Referring to the drawings in more detail:

The reference numeral 1 generally indicates a roll-over plow structure embodying this invention. The plow structure 1 is adapted for pulling by a suitable tractor 2 having spaced apart mounting members 3 thereon (FIG. 1). A draft frame 4 has forwardly extending arms 5 pivotally secured respectively to the mounting members 3 for only vertically swinging motion of the draft frame with respect to the tractor 2. The draft frame 4 includes horizontally spaced apart arms 6 extending rearwardly therefrom. Extensible hydraulic cylinders 7 are pivotally mounted to the tractor and to the draft frame on respective upwardly projecting brackets 8 and 9 (FIG. 2) whereby, upon suitably connecting the hydraulic pressure system of the tractor thereto, the cylinders 7 are operable to vertically swing the draft frame rear arms 6 vertically about the mounting members 3.

A horizontal draft bar 9' extends between the draft frame rear arms 6 and is mounted thereon to rotate about a horizontal axis transverse to the tractor at opposite ends 10 and 11 as best illustrated in FIG. 4. A rearwardly directed front socket member 12 is pivotally mounted on the draft bar 9 intermediate the ends 10 and 11 at 13 for only lateral swinging motion thereon. A front bearing plug 14 is fixed in the front socket member by suitable anchor rods 15 and projects rearwardly therefrom.

A hollow rigid support tube or beam 16 has a short front portion 17, an elongated intermediate portion 18 and a short rear portion 19. The beam front portion 17 is normally axially aligned with the longitudinal center line of the tractor 2 and rotatably receives and axially retains the front bearing plug 14 therein by structure now described. The socket member 12 includes a radial flange 20 which is urged into sliding face contact with a radial flange 21 formed at the front end of the short beam portion 17. The front bearing plug 14 has a radial flange 22 projecting radially outwardly from the body therefrom but rotatable within the support beam front portion 17. An anchor sleeve 23 is fixed within the mouth of the front portion 17 and engages the flange 22 whereby the bearing plug 14 cannot move out of the front portion 17 but may rotate therewithin. The flanges 20 and 21 provide a substantial bearing surface permitting relative rotation between the socket member 12 and the support beam 16 but maintaining coaxial alignment between the socket member 12 and support beam front portion 17 at all times.

An hydraulic cylinder 24 has the ram 25 thereof pivotally connected to a rigid bracket 26 on the draft bar 9 and the body thereof pivotally mounted on a bracket 27 fixed to the radial flange 20 of the socket member 12. Thus, the cylinder 24 remains relatively stationary with respect to the socket member 12 regardless of the rotation of the support beam front portion 17 about the plug 14 or the lateral pivoting of the entire structure about the draft bar 9. This lateral pivoting, however, causes the ram 25 to telescope into and out of the cylinder 24.

An hydraulic motor 28 is also suitably secured to the bracket 27 and has a pinion 29 engaged with a spur gear 30 rigidly mounted on and surrounding the support beam front portion 17. The operation of the hydraulic motor 28, rotating the pinion 29, produces relative rotation between the support beam front portion 17 and the socket member 12 regardless of the lateral pivotal position of the socket member 12 with respect to the draft bar 9 or the vertical pivotal position of the draft bar 9 with respect to the draft frame arms 6.

The beam intermediate portion 18 angles rearwardly and laterally of the beam front portion 17 as best illustrated in FIG. 1. The beam rear portion 19, however, extends parallel to but normally laterally offset from the beam front portion 17.

A rear carriage 31 has a downwardly directed rotatable axle 32 extending therefrom. A wheel 33 is mounted on the lower portion of the axle 32 and supports the carriage 31 above the ground. The rotation of the axle 32 causes the wheel 33 to change in direction in respect to the tractor 2 for steering the rear carriage 31. A rear bearing plug 34 is rigidly mounted within a carriage socket 35 and projects forwardly therefrom. The socket 35 is similar in structure to the socket member 12 and connects to the rear carriage 31 through parallel sets of rigid arms 36 which are pivotally connected at opposite ends respectively thereto. A selected arm 36 has a lever 37 rigid therewith and pivotally engaging the ram 38 of an hydraulic cylinder 39 pivotally anchored to the carriage socket member 35. Thus, the extension and contraction of the ram 38 causes the carriage socket member 35 to move vertically with respect to the rear carriage 31.

An hydraulic cylinder 40 is pivotally anchored at one end thereof to the carriage socket member 35 and at the other, or ram, end to a lever 41 rotatably fixed with respect to the axle 32 whereby the extension and contraction of the cylinder 40 causes the wheel 33 to be steered with respect to the carriage socket member 35.

The front bearing plug 14 has a rearwardly projecting spline stub 42 thereon near the junction between the support beam front portion 17 and intermediate portion 18. Likewise, the rear bearing plug 34 has a forwardly projecting spline stub 43 within the support beam adjacent the junction between the support beam rear portion 19 and intermediate portion. Universal joints 44 and 45 are respectively connected to the spline stubs 42 and 43 and are joined together through the support beam intermediate portion 18 by a torsion shaft 45. Thus, the rear carriage 31 is axially rotatably fixed with respect to the draft bar 9 although the support beam 16 is free to rotate with respect to the draft bar 9 under actuation of the hydraulic motor 28.

Hydraulic hoses 46 and 47 are respectively connected between the rear chambers and front chambers of the hydraulic cylinders 24 and 40 whereby the extension or contraction of the cylinder 24, due to lateral pivoting of the socket member 12 on the draft bar 9, is reflected in the steering of the wheel 33 in a direction opposite to the direction of lateral pivoting. Thus, the rear carriage 31 does not merely trail the tractor but rather is steered rapidly to a position aligned behind one of the tractor wheels, reducing the turning space necessary to begin a new adjacent plowing path.

Suitable tool carriers 48 are rigidly secured in spaced apart relation to and along the support beam 16 and extend laterally therefrom progressively different distances where they branch in opposite, normally vertical directions for simultaneously carrying right and left hand plow units 49 and 50 thereon.

In operation, the tractor 2 pulls the plow structure 1, which trails therebehind substantially as shown in FIG. 1. The hydraulic cylinder 7 and 39 are actuated to vertically adjust the support beam 16 for the desired plowing depth of the plow units. At the end of a plowing path, the tractor is turned 180° to begin a new plowing path adjacent the preceding path but in the opposite direction. Preferably while the tractor is being turned, the cylinders 7 and 39 are operated to raise the plowing units out of the ground and the hydraulic motor 28 is actuated to twist or longitudinally rotate the support beam 16 180° for bringing the opposite-hand plow units to a downwardly directed position. This twist or rotation causes the rear carriage 31 to assume a position trailing the opposite side of the longitudinal center line from the previous plowing operation as illustrated by the change from solid lines to broken lines 51 in FIG. 3. The proper trailing position of the rear carriage 31 is attained in a shortened time and within a smaller area due to the steering of the wheel 33 caused by the lateral pivoting of the draft bar 9 with respect to the socket member 12 as the tractor is turned. Upon being properly aligned with the opposite-hand plows in downwardly directed condition, the cylinders 7 and 39 are again actuated to bring the opposite hand plows to a desired depth below ground level for plowing the new path adjacent the previous path.

It is to be understood that although one form of this invention has been illustrated and described, this invention is not to be limited thereto except insofar as such limitations are included in the following claims.

What is claimed and desired to be secured by Letters Patent is:

1. A two-way plow adapted for pulling by a tractor comprising:
    (a) a hollow rigid support beam having a front portion and an elongated intermediate portion and a rear portion,
    (b) joining means adapted to pivotally and axially rotationally connect said beam front portion to the rear of said tractor for support of said beam front portion above the ground and lateral pivoting and axial rotation of said support beam with respect to said tractor, said joining means having a draft frame with a forward portion adapted to be pivotally mounted on said tractor for only vertical swinging motion and with horizontally spaced apart arms extending rearwardly, means for engaging said tractor and said draft frame and operable to vertically swing said draft frame arms about said tractor,
    (c) a horizontal draft bar extending between said draft frame arms and rotatably mounted at opposite ends thereon, socket means pivotally mounted on said draft bar intermediate said draft frame arms for only lateral swinging motion thereon, said socket means being connected to said support beam front portion,
    (d) said beam intermediate portion angling horizontally rearwardly and laterally of said beam front portion, said beam rear portion being laterally offset from said beam front portion,
    (e) a rear carriage, joining means connecting said beam rear portion to said carriage for support of said beam rear portion above the ground, said last named joining means being adapted to permit axial rotation of said support beam with respect to said carriage,
    (f) elongated torsion resisting means within said support beam, means for rotatably fixing said torsion resisting means with respect to said tractor and said carriage,
    (g) tool carriers spaced along said support beam, right and left hand plow units on said respective tool carriers, and means for selectively rotating said support beam about said torsion resisting means.

2. The plow structure as set forth in claim 1 wherein said means for engaging said tractor and said draft frame comprises
    (a) hydraulically operated force producing means.

3. A two-way plow adapted for pulling by a tractor comprising:
    (a) a hollow rigid support beam having a front portion and an elongated intermediate portion and a rear portion, joining means adapted to pivotally and axially rotationally connect said beam front portion to the rear of said tractor for support of said beam front portion above the ground and lateral pivoting and axial rotation of said support beam with respect to said tractor,
(b) an extensible front hydraulic ram adapted for operable connection between said support beam and said tractor for extension and contraction in response to lateral pivoting of said support beam with respect to said tractor, front and rear hydraulic connections on said front ram,
(c) said beam intermediate portion angling horizontally rearwardly and laterally of said beam front portion, said beam rear portion being laterally offset from said beam front portion,
(d) a rear carriage, joining means connecting said beam rear portion to said carriage for support of said beam rear portion above the ground, said last named joining means being adapted to permit axial rotation of said support beam with respect to said carriage,
(e) said rear carriage having a downwardly directed axle, at least one wheel on said axle and movably supporting said carriage on the ground, said axle being axially pivotable with respect to said carriage for steering said wheel, an extensible rear hydraulic ram operably connected between said axle and said support beam for extension and retraction in response to the pivoting of said axle, said rear ram having front and rear hydraulic connections,
(f) hydraulic hoses connected between selected front and rear ram hydraulic connections whereby said wheel is automatically steered in an opposite direction to the turn direction of said tractor with respect to said support beam,
(g) elongated torsion resisting means within said support beam, means for rotatably fixing said torsion resisting means with respect to said tractor and said carriage,
(h) tool carriers spaced along said support beam, right and left hand plow units on said respective tool carriers, and means for selectively rotating said support beam about said torsion resisting means.

4. A two-way plow adapted for pulling by a tractor comprising:
(a) a hollow rigid support beam having a front portion and an elongated intermediate portion and a rear portion, joining means adapted to pivotally and axially rotationally connect said beam front portion to the rear of said tractor for support of said beam front portion above the ground and lateral pivoting and axial rotation of said support beam with respect to said tractor,
(b) said beam front portion joining means includes a rearwardly directed socket member, a front bearing plug fixed in said front socket member and projecting rearwardly therefrom,
(c) said beam front portion rotatably receiving said bearing plug therein, and means axially retaining said front bearing plug in said beam front portion but permitting relative rotation therebetween,
(d) said beam intermediate portion angling horizontally rearwardly and laterally of said beam front portion, said beam rear portion being laterally offset from said beam front portion,
(e) a rear carriage, joining means connecting said beam rear portion to said carriage for support of said beam rear portion above the ground, said last named joining means being adapted to permit axial rotation of said support beam with respect to said carriage,
(f) elongated torsion resisting means within said support beam, means for rotatably fixing said torsion resisting means with respect to said tractor and said carriage,
(g) tool carriers spaced along said support beam, right and left hand plow units on said respective tool carriers, and means for selectively rotating said support beam about said torsion resisting means.

5. A two-way plow adapted for pulling by a tractor comprising:
(a) a hollow rigid support beam having a front portion and an elongated intermediate portion and a rear portion, joining means adapted to pivotally and axially rotationally connect said beam front portion to the rear of said tractor for support of said beam front portion above the ground and lateral pivoting and axial rotation of said support beam with respect to said tractor,
(b) said beam intermediate portion angling horizontally rearwardly and laterally of said beam front portion, said beam rear portion being laterally offset from said beam front portion,
(c) a rear carriage, joining means connecting said beam rear portion to said carriage for support of said beam rear portion above the ground, said last named joining means being adapted to permit axial rotation of said support beam with respect to said carriage,
(d) said beam rear portion joining means includes a bearing plug rigidly mounted on said carriage and projecting forwardly therefrom,
(e) said beam rear portion rotatably receiving said bearing plug therein, and means axially retaining said rear bearing plug in said beam rear portion but permitting relative rotation therebetween,
(f) elongated torsion resisting means within said support beam, means for rotatably fixing said torsion resisting means with respect to said tractor and said carriage,
(g) tool carriers spaced along said support beam, right and left hand plow units on said respective tool carriers, and means for selectively rotating said support beam about said torsion resisting means.

References Cited
UNITED STATES PATENTS

| | | | |
|---|---|---|---|
| 2,830,519 | 4/1958 | Chandler et al. | 172—294 X |
| 3,061,020 | 10/1962 | Mannheim | 172—285 |
| 3,357,501 | 12/1967 | Watts | 172—212 X |

ROBERT E. PULFREY, Primary Examiner

R. C. HARRINGTON, Assistant Examiner

U.S. Cl. X.R.

172—285, 413